T. GEE.
NUT LOCK.
APPLICATION FILED MAR. 30, 1918.
1,286,584.
Patented Dec. 3, 1918.
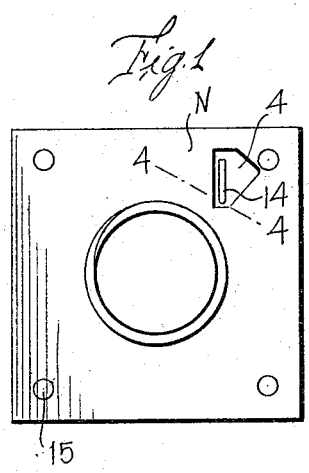
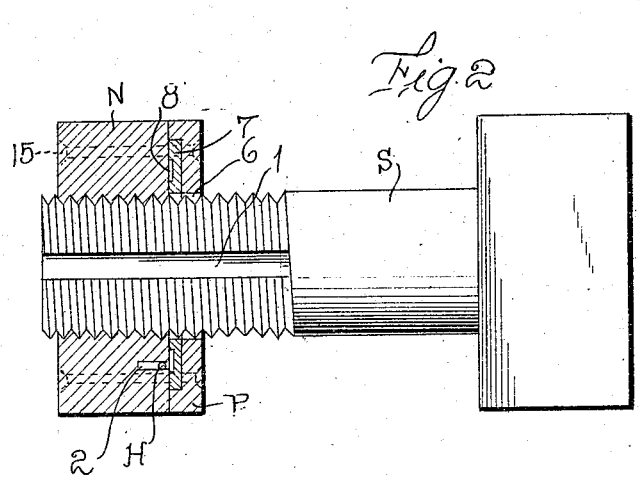
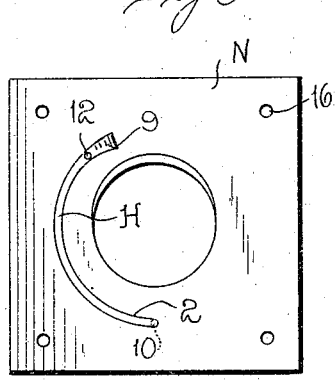
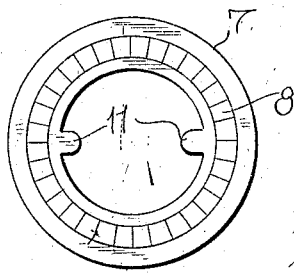
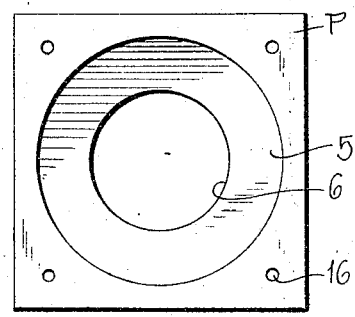
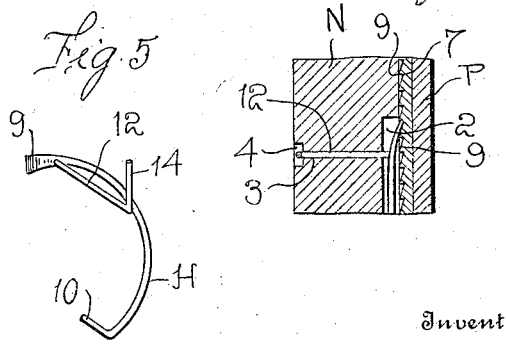
Inventor
Tracy Gee
By Watson E. Coleman
Attorney

UNITED STATES PATENT OFFICE.

TRACY GEE, OF CHESTER, MONTANA.

NUT-LOCK.

1,286,584.

Specification of Letters Patent.

Patented Dec. 3, 1918.

Application filed March 30, 1918. Serial No. 225,781.

*To all whom it may concern:*

Be it known that I, TRACY GEE, a citizen of the United States, residing at Chester, in the county of Hill and State of Montana, have invented certain new and useful Improvements in Nut-Locks, of which the following is a specification, reference being had to the accompanying drawings.

This invention relates to certain improvements in nut locks and it is an object of the invention to provide a novel and improved lock of this general type whereby the nut is provided with means engageable with the bolt for holding the bolt against retrograde movement relative to the bolt together with an arrangement whereby said means may be readily rendered inoperative when it is desired to separate the nut and bolt.

It is also an object of the invention to provide a novel and improved device of this general character including a nut engageable with the bolt and wherein said nut has arranged therein a member interlocking with the bolt when the nut is applied and which member and nut are capable of relative independent movement together with means carried by the nut and coacting with the member for holding said nut and member against movement whereby the nut is effectively held against retrograde movement about the bolt.

The invention consists in the details of construction and in the combination and arrangement of the several parts of my improved nut lock whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings, wherein:

Figure 1 is a view in elevation of the outer face of a nut constructed in accordance with an embodiment of my invention;

Fig. 2 is a view partly in elevation and partly in section illustrating a coacting nut and bolt constructed in accordance with my invention as herein disclosed:

Fig. 3 is a view in elevation of the inner face of the main body of my improved nut as herein set forth;

Fig. 4 is a fragmentary sectional view taken substantially on the line 4—4 of Fig. 1;

Fig. 5 is a view in perspective of the holding member or spring as herein included;

Fig. 6 is a view in elevation of the inner face of the plate coacting with a face of the nut proper; and Fig. 7 is a view in elevation of the interlocking annular member or washer employed in connection with the nut.

As disclosed in the accompanying drawings S denotes the shank of a bolt having the threads thereof interrupted at diametrically opposed points by a groove or channel 1 extending longitudinally of the shank S and open at its outer end.

N denotes a nut adapted to be threaded upon the shank S and which is provided in its inner face with the arcuate groove 2 substantially concentric to the bore of the nut N and one end portion of the arcuate groove 2 has in communication therewith the opening 3 extending through the nut N and open at the outer face of the nut. The outer end portion of the opening 3 is enlarged as at 4.

Overlying the inner face of the nut N is a plate P having its inner face provided with a circular chamber 5 concentric to the bore of the nut N and said chamber 5 at its axial center is provided with an opening 6 through which the shank S of the bolt is freely directed. Snugly fitting within the chamber 5 is an annular member 7 provided on its inner face or the face thereof opposed to the nut N with an annular series of ratchet teeth 8 and with which coacts the outwardly offset portion 9 of the holding member or spring H. The holding member or spring H comprises an arcuate length of resilient wire of requisite gage having an end portion thereof remote from the offset or tooth 9 provided with an angular extension 10 embedded in the bottom or base of the groove 2 at the end thereof. The member or spring H constantly urges the offset or tooth 9 thereof to contact with the annular member or washer 7 so that said offset or tooth 9 may coact with the teeth 8 to normally prevent relative independent movement of the nut N and the annular member or washer 7 in one direction. The inner margin of the member or washer 7 is provided with the inwardly directed tongues or extensions 11 each of which being seated within the groove or channel 1 when the nut N is applied to the shank S and whereby it will be perceived that when the nut N is applied to the shank S, the member or washer 7 is held against rotary movement about the shank. As the nut N is turned about the shank S toward the work the offset or tooth 9 coacts with the teeth 8 to hold the nut N against reverse rotation so that when the outer face of the plate P is brought into proper contact with the work, it is assured that the nut N will be effectively held in applied position.

The end portion of the member or spring H in close proximity to the offset or tooth 9 has secured thereto the rod 12 which is directed through the opening 3 in the nut N and has its outer end terminating within the enlarged portion 4 of said opening. The outer end of the rod 12 is provided with the lateral extension 14 which is adapted to be engaged in any suitable manner to impart inward movement to the free end portion of the member or spring H so that the offset or tooth 9 may be disengaged from the annular member or washer 7 when it is desired to remove the nut N from the shank S.

The plate P may be secured to the inner face of the nut N in any desired manner, but it is preferred that the rivets 15 be employed and which rivets are disposed through registering openings 16 arranged at the corners of the nut N and plate P.

From the foregoing description, it is thought to be obvious that a nut lock constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a shank provided with a channel disposed longitudinally thereof, a nut coacting with said shank and provided within its inner face with a slot substantially concentric to the bore thereof and having an opening in communication with one end portion of the slot and opening at the outer face of the nut, a plate overlying the inner face of the nut and secured thereto, the inner face of the plate being provided with a circular chamber concentric to the bore of the nut, said plate at the axial center of the chamber being provided with an opening through which the shank is insertible, an annular member snugly fitting within the chamber and provided on its inner face with an annular series of ratchet teeth, a spring arranged within the slot of the nut and having one end portion anchored to the nut, the opposite end portion of the spring being provided with a tooth normally engaging a ratchet tooth of the annular member, said annular member being provided with an extension seatable within the groove of the shank, and means engageable with the spring adjacent the tooth thereof and extending through the opening of the nut to afford means for disengaging the tooth from the ratchet teeth carried by the annular member.

2. In combination with a shank provided with a channel disposed longitudinally thereof, a nut coacting with said shank and provided within its inner face with a slot substantially concentric to the bore thereof and having an opening in communication with one end portion of the slot and opening at the outer face of the nut, a plate overlying the inner face of the nut and secured thereto, the inner face of the plate being provided with a circular chamber concentric to the bore of the nut, said plate at the axial center of the chamber being provided with an opening through which the shank is insertible, an annular member snugly fitting within the chamber and provided on its inner face with an annular series of ratchet teeth, a spring arranged within the slot of the nut and having one end portion anchored to the nut, the opposite end portion of the spring being provided with a tooth normally engaging a ratchet tooth of the annular member, said annular member being provided with an extension seatable within the groove of the shank, and a rod engaged with the spring adjacent the tooth thereof and extending through the opening in the nut, the outer end of said rod being provided with an angular extension, the outer end portion of the opening in the nut being enlarged and in which the angular extension of the rod is normally positioned.

In testimony whereof I hereunto affix my signature in the presence of two witnesses.

TRACY GEE.

Witnesses:
A. F. BRUSS,
I. S. RISSEAR.